Patented Mar. 17, 1953

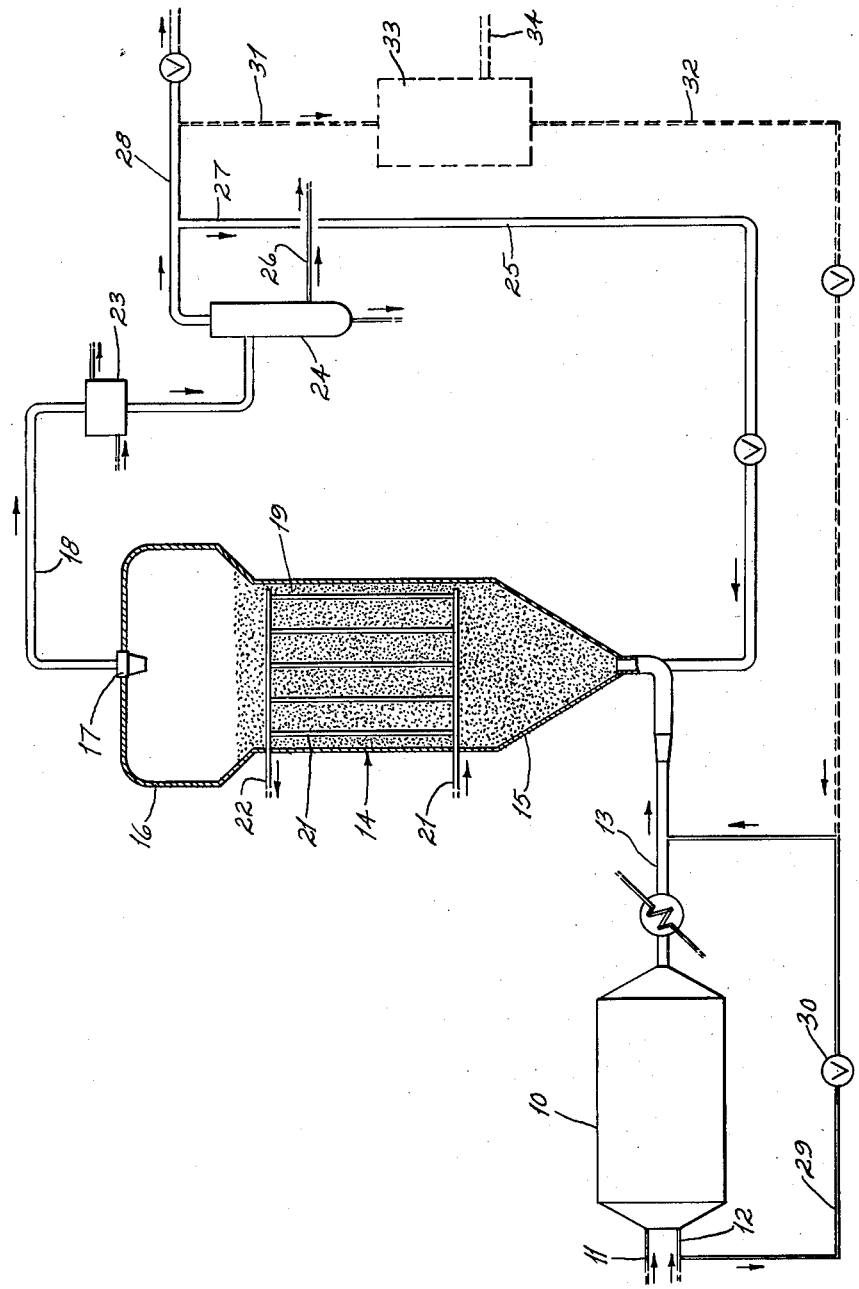

2,632,017

UNITED STATES PATENT OFFICE 2,632,017

CATALYTIC SYNTHESIS OF HYDROCARBONS

Du Bois Eastman, Scarsdale, and Leon P. Gaucher, Mount Vernon, N. Y., assignors to The Texas Company, New York, N. Y., a corporation of Delaware Application June 17, 1947, Serial No. 755,236

5 Claims. (Cl. 260—449.6)

1

The present invention relates to the catalytic synthesis of hydrocarbons and oxygenated compounds, and is more particularly concerned with the production of synthetic normally liquid hydrocarbons, preferably in the motor gasoline boiling range or thereabouts, by the catalytic reduction of carbon monoxide with hydrogen in the presence of the well known catalysts for this process.

More particularly the present invention contemplates recycle of the normally gaseous reaction products of the reaction in an optimum proportion with respect to the supply of fresh feed reactant gases, while fortifying the reactants with a substantial proportion of additional light saturated hydrocarbon gases such as methane, preferably in a relatively pure condition and in any event free from more than a minor proportion of other gases such as carbon monoxide, carbon dioxide, hydrogen and water vapor, active in the process. The invention is particularly concerned with catalytic processes using conventional hydrocarbon synthesis catalysts together with, or without, typical activators or promoters. It has particular application to the iron catalysts as well as iron-cobalt and iron-chromium catalysts effective at temperatures in the range of 550-700° F. and at elevated pressures and has for its primary object to cause the catalytic interaction of carbon monoxide and hydrogen with the predominant production of normally liquid hydrocarbons to the substantial exclusion of net methane and carbon dioxide production.

As is known, carbon monoxide and hydrogen, in contact with catalysts of the foregoing class, under usual operating conditions, tend to result in undesirable production of carbon dioxide which may be more or less suppressed by numerous expedients, including that of supplying substantial proportions of carbon dioxide to the inlet feed; using high ratios of hydrogen to carbon monoxide; and the like. While net formation of carbon dioxide is thus frequently lessened substantial volumes of carbon dioxide are involved which limit additional gas plant facilities, and the capacity of any given reactor for the treatment of the primary reactants, namely carbon monoxide and hydrogen. Moreover, such expedients do not obviate the problem involved in the formation of by-product methane or similar light hydrocarbon gases, and, in fact usually alleviate excessive carbon dioxide production, to the further detriment of excess methane formation.

2

In accordance with the present invention, it has been found that in general while methane and carbon dioxide are both formed to a substantial extent during the course of the reaction in question, nevertheless, as the reaction approaches completion both tend to be rapidly consumed. It has also been discovered that the extent of the completion of the reaction in question is a function of recycle ratio. In other words, irrespective of such things as contact time, temperature (within the specified range), and the specific catalyst, the extent to which the available carbon monoxide and hydrogen are consumed in the production of hydrocarbon increases with the rate at which the normally gaseous reaction products, the so-called tail gas, are recycled to the inlet feed of the reactor in admixture with the fresh feed synthesis gas. Thus at a recycle ratio substantially less than 1:1 and with a typical fresh feed gas containing about 2 parts of hydrogen to 1 part of carbon monoxide, conversion of the hydrogen will usually be less than 80% based on the hydrogen available for conversion in the fresh feed. At a recycle ratio of 1.2, on the other hand, about 90% of the hydrogen is converted, and this rises to a value of about 95% conversion at a recycle ratio of 3.5 and 98% at a recycle ratio of about 6.

While from the foregoing it is apparent that increase in recycle ratio permits the reaction to go toward completion, nevertheless, it is equally true that, with typical feed gases, the increase in the recycle rate, necessary to approach theoretical completion, is responsible for an overall increase in net methane production. For example, with usual fresh feed streams containing in the neighborhood of two volumes of hydrogen per volume of carbon monoxide, at recycle rates in the neighborhood of 1.5:1 (volume of recycle to fresh feed), the net methane production approaches a negligible value with complete consumption of the available reactants. On the other hand, at higher recycle ratios, as for example, those substantially above 3:1, recycling induces a sharp increase in net production of methane which persists even though the reaction is thereby caused to approach closer completion. In other words, as clearly disclosed in our copending application Serial No. 755,235 filed June 17, 1947, now abandoned, there is a critical range of recycle ratios corresponding to each fresh feed ratio of hydrogen to carbon monoxide at which net methane production based on carbon monoxide consumed reaches a desirable, and usually negligible minimum.

Below this range methane formation is excessive, and above it recycling results in a sharply higher ultimate methane in the gasiform products of reaction and therefore a lower yield of the desired hydrocarbons.

The problem of net carbon dioxide formation is not so affected by recycling but on the contrary, with usual fresh feed compositions, increasing recycling and, accordingly, better completion of the reaction between the hydrogen and carbon monoxide, the carbon dioxide at first formed during the course of the reaction is thereafter rapidly consumed and thus approaches a desirable minimum in a later stage of the reaction when consumption of the carbon monoxide and hydrogen approaches completion. The foregoing statement is particularly true with fresh feed synthesis gas compositions containing hydrogen and carbon monoxide in the proper combining ratio, namely, about 2:1 and in the range from about 1.5:1 to about 2.5:1. At lower ratios of about 1.1, for example, ultimate carbon dioxide formation, regardless of the degree of conversion of the reactant hydrogen and carbon monoxide, may be relatively high simply because of the relative excess of carbon monoxide for the desired reaction

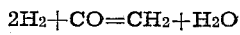
$$2H_2 + CO = CH_2 + H_2O$$

and the resulting tendency to further the reaction

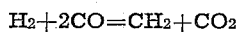
$$H_2 + 2CO = CH_2 + CO_2$$

However with due regard to this particular side effect, a low net production of carbon dioxide approaching optimum can be maintained by high rates of recycle or other means for promoting conversion in systems using fresh feed synthesis gas having an $H_2:CO$ ratio of from about 1:1 to about 4:1, but usually only at the expense of excessive methane formation.

The present invention overcomes the foregoing disadvantages and secures concurrent low net methane and carbon dioxide formation by operating at a recycle rate particularly favorable to minimum net methane formation while carrying the degree of conversion and accordingly carbon dioxide suppression, materially beyond that which would be characteristic of such recycle, by fortifying the fresh feed with methane or other light saturated hydrocarbon gas. In short, while operating in a recycle range not greater than that favorable to minimum net production of methane, a materially enhanced degree of conversion is effected through the agency of an additional increment of saturated hydrocarbon gas which contributes all of the benefits of higher rates of recycle without the disadvantage of an increase in net methane formation.

In addition to the foregoing effect, the added methane by itself appears to exert a further influence in suppressing net methane formation.

From the standpoint of economics the addition of methane to the feed is not disadvantageous and is in fact beneficial in that the process, as normally practiced, requires the expenditure of excess thermal energy in the operation of the associated plant and facilities. This can be provided for by the complete combustion of waste combustible gases. Accordingly, the saturated hydrocarbon supplied to the synthesis reactor in accordance with the present invention may be of any selected quantity corresponding to the power requirements of the plant; the effluent gases from the reactor, after separation of the desired reaction products, being conveyed directly to the power plant for recovery of the required thermal energy. In short, the methane added to the feed passes through the reactor essentially unchanged, and usually is not consumed in the overall reaction.

In accordance with the present invention, therefore, the fresh feed synthesis gas containing essentially hydrogen and carbon monoxide preferably in the usual molar ratio of about 2:1, but generally in the range of about 1.5:1 to about 2.5:1, and broadly from about 1:1 to about 4:1, is supplied to any typical synthesis reaction zone containing a mass of synthesis catalyst at the temperature, pressure and space velocity conventional for that catalyst. It is to be understood that the catalyst to be employed may be any catalyst operative for the synthesis of liquid hydrocarbons and oxygenated compounds from hydrogen and carbon monoxide at temperatures preferably from 600–650° F., and broadly from about 500–700° F. Insofar as the catalytic effect is active, substantial and typical of those met with in the present art, the specific catalyst is for the purpose of the present invention of little moment. In short the invention contemplates a process wherein the major chemical effect results from the activity of the catalyst in promoting the catalytic reduction of carbon monoxide by hydrogen as contrasted with essentially thermal reactions.

A suitable catalyst may involve iron in powdered form usually with the addition of typical promoters or activators such as the oxides of the alkali metals or alkali earth metals, alumina, thoria, zirconia and many others.

Similarly within the range provided above, temperature has little effect upon the process of the present invention. The same is true of operating pressure which should advantageously be in the super atmospheric range, for example, from 50–300 pounds per square inch gauge, preferably from 150–250 pounds per square inch gauge.

In referring to the broad conventional range of space velocity and contact times, it is to be understood that these are substantially immaterial within the wide limits conventionally met with, including all of the values typical of catalytic commercial reactors wherein reacant gases pass through a contact mass. For instance, the practice of the present invention is not altered materially whether the space velocity be at a value of 1 or as high as 5,000 based upon the volume of fresh gaseous feed per hour per volume of catalyst; provided, of course, that heat control or other specific conditions of operation are not materially affected so as to cause localized overheating beyond the optimum temperature range of the catalyst.

The fresh feed reactant gas, prior to introduction to the reaction zone, is admixed with a substantial stream of saturated hydrocarbon gas as well as with a stream of tail gas consisting of the normally gaseous reaction products withdrawn from the reaction zone, after separation of the major portion, at least, of the normally liquid constituents, removable by condensation at temperatures below about 200° F. and preferably about 100° F. The process is continuously operated with the withdrawn gasiform reaction products subjected to condensation and separation at some convenient temperature such as for example 70° F., with recovery of the liquid hydrocarbons and separation of condensed water, and recycling of the uncondensed gaseous residue to the reactor inlet, at the rate indicated.

The recycle stream of tail gas is conducted into admixture with the fresh feed synthesis gas in a molar ratio preferably not greater than that taught in the aforesaid copending application and determined by the following relationship:

$$Y = \frac{4.46}{X} - 0.64 \pm 0.3$$

Where X is the molar ratio of hydrogen to carbon monoxide in the fresh feed synthesis gas supplied to the reactor containing the synthesis catalyst; and Y is the recycle ratio which the recycle stream of normally gaseous reaction products from the reactor bears to the stream of fresh feed reactant gas; expressed as the ratio between the number of standard cubic feet of normally gaseous products of reaction being recycled and the number of standard cubic feet of fresh feed synthesis gas being supplied to the system per unit time of operation.

As indicated above the foregoing relationship expresses an optimum range within which the curve of net methane formation reaches a minimum of close to zero, and not more than 5% net methane formation. With a substantial addition of extraneous methane, as herein disclosed, it is possible to operate satisfactorily somewhat below this range at some sacrifice in benefits. Therefore in its broadest aspect, the invention contemplates any recycling at a rate within a broad range from a lower limit involving any substantial degree recycling, as for example, about 0.5:1 up to the upper limit of the range of recycle rates determined by the above relationship, with the addition of the extraneous light hydrocarbon gases serving to counteract the excessive net formation of methane which would otherwise occur.

Most advantageously the optimum recycle rate is within the range given by the foregoing relationship and preferably is a value intermediate between the limits of the range given, in other words where the recycle rate approximates the more limited value of Y determined by the following relationship:

$$Y = \frac{4.46}{X} - 0.64$$

The supplemental saturated hydrocarbon gas is supplied to the total feed in the form of methane, ethane, or even propane, although in the usual case, methane being generally more widely available is advantageous and will be hereinafter referred to by way of simplifying the following disclosure. Preferably the methane is added in some substantial proportion as for example in amounts greater than 25%, and preferably from 40-200% by volume on the basis of the carbon monoxide present in the fresh feed.

In general it may be stated that an increase in added light hydrocarbon gases such as methane furthers the total degree of conversion of the primary reactants, namely the hydrogen and carbon monoxide available in the fresh feed; that is, it carries the reaction toward completion with close approach toward optimum consumption of fresh feed reactants and yield of liquid hydrocarbons without embodying any tendency to form additional carbon dioxide or light hydrocarbon gases. Moreover it effects a high degree of conversion which usually only is characteristic of much higher, and uneconomical, recycle rates. The net production of methane will remain, in all cases hereunder substantially below 5% on the basis of the carbon monoxide consumed, and usually at a negligible value approaching zero.

In general there is no critical upper limit upon the range of methane which may be advantageously incorporated in the total inlet fed to the reactor since progressive benefits, in respect to suppression of undesired by-products, appear to accrue from its increasing addition. In practical effect, however, the upper limit of methane concentration is usually set by the quantity of methane which can be incorporated without unduly limiting the conversion capacity of the reactor, and without exceeding that quantity that can later be consumed in meeting the thermal requirements of the plant. In short, based upon these limitations, it is possible to circulate through the reactor and then to the heat recovery instrumentalities a stream of methane which would otherwise be directly consumed in the creation of heat energy and which by this indirect usage improves the overall yield in a degree commensurate with its volume.

The stream of fresh feed synthesis gas supplied to the reactor advantageously is one which is either free from carbon dioxide and water vapor, or one in which these constituents are maintained at a negligible low value below about 5% and preferably below 3% respectively on a molar basis. In general, substantially greater quantities of these undesired diluents tend to alter optimum recycle ratio. So also a low concentration of inerts such as nitrogen is obviously to be desired.

Similarly, the added methane or other light saturated hydrocarbon gas should best comprise essentially methane or its equivalent, that is to say, with only negligible proportions less than 5% and preferably less than 1%, of reactant impurities such as water vapor, and carbon dioxide respectively. The term, "light saturated hydrocarbon gases," as used herein, is intended to includes those saturated normally gaseous hydrocarbons containing less than four carbon atoms, which for the present purpose are approximately equivalent in character to the methane, such as ethane, and propane. Methane, however, is preferred, although each exerts the effect of suppressing the formation of methane with a concurrent effect, in appreciable degree, of suppressing the formation of the other light hydrocarbon gases which tend to form in the present reaction.

Referring now to the attached drawing, there is disclosed, more or less diagrammatically, one illustrative form of apparatus suitable for practicing the present invention. This includes a synthesis gas generator 10 of any conventional form supplied with oxygen from any suitable source not shown through an inlet conduit 11. Preferably, though not necessarily, the stream of oxygen is relatively pure in the range of 90-95% purity or even higher. In the generator it is mixed with a suitable hydrocarbon gas such as methane or natural gas supplied from any convenient source not shown by way of pipe 12. The gases are reacted for example in the usual manner, preferably without catalyst, at a temperature of 2100° F. or higher in a suitable proportion to form a mixture of hydrogen and carbon monoxide in the relative ratio of 2:1, which is withdrawn through pipe 13 and supplied to the base of a synthesis reactor 14.

The details of the synthesis reactor while per se forming no part of the present invention, may advantageously take the general form illustrated, with a conical lower extremity 15 and an enlarged upper extremity 16 discharging through a filter 17 into an outlet conduit 18. A mass of fluidized catalyst 19 within the reactor 14 rises to the pseudo-liquid level indicated under the fluidizing effect of the upflowing reactant gases and immerses suitable cooling surfaces more or less diagrammatically illustrated by the exchanger 20 to which a cooling fluid is supplied by inlet pipe 21 and withdrawn through pipe 22.

The effluent gasiform reaction products from the reactor pass through condenser 23 to separator 24 from which condensed water is withdrawn by way of pipe 25 and the liquid hydrocarbon layer recovered through pipe 26. The liquid hydrocarbon layer constituting the desired product of the process in question may be conveyed to any suitable instrumentalities for further treatment or other disposition as desired.

The residual normally gaseous hydrocarbons herein referred to as tail gas pass overhead from the separator 24 to pipe 27, a portion being recycled to the pipe 13 at the desired rate of recycle indicated above. Valved branch pipe 28 permits venting the tail gas in excess of that desired for recycle, advantageously to a suitable point for thermal recovery as indicated above.

It is to be generally noted that a portion of the methane supplied through pipe 12 is passed by way of branch pipe 29 and valve 30 to the fresh feed reactants supplied through conduit 13 so that reactor 14 is continuously fed with a gaseous mixture comprising the fresh feed reactant gases from the generator 10, an extraneous stream of methane from pipe 29, and the recycle stream from pipe 27. Various other means for supplying the extraneous saturated hydrocarbon stream will at once occur to those skilled in the art in view of the above disclosure.

One such means is indicated in the dotted lines including the pipes 31 and 32 and the gas recovery system 33. The gas recovery plant in question, illustrated only symbolically, may include means for supplying relatively substantially pure methane or ethane through pipe 32 while discarding other gaseous components, essentially unsaturated hydrocarbon gases, carbon dioxide and oxygenated hydrocarbon gases through pipe 34.

Various other expedients will occur to those skilled in the art. For example, the synthesis gas need not necessarily be formed from methane as above, but can be produced by other conventional means such as the partial combustion of liquid petroleum fractions or coke, including treatment with oxidizing agents such as water vapor and carbon dioxide.

In accordance with one illustrative example, a fresh feed synthesis gas, comprising about 64% hydrogen and about 32% carbon monoxide, the remainder including small quantities of nitrogen, methane and carbon dioxide, is admixed with natural gas comprising essentially methane in the ratio of about 1 part of natural gas to 2 parts of synthesis gas. The gaseous mixture is supplied to the lower portion of a mass of catalyst comprising an iron catalyst powder of 200 mesh and finer containing about 1% of sodium oxide and about 1% of alumina.

The catalyst mass is maintained at a temperature of 600° F. by suitable cooling surfaces enclosed therein, and the system operates at 200 pounds per square inch gauge. The gasiform reactant products withdrawn from the catalyst are condensed at a temperature of 80° F. and the separated gases are recycled into admixture with the hydrogen-carbon monoxide-methane fresh feed mixture being supplied to the lower portion of the catalyst in the ratio of 1.3 volume of recycle stream to 1 volume of the fresh feed synthesis gas, namely the synthesis gas less the added methane. Over an extended period of settled operation, the percent of conversion of the hydrogen supplied in the fresh feed is equal to about 96-97%. It is significant to note that there is substantially no net production of methane within the limits of measurement of ordinary analysis. At the same time the net production of carbon dioxide is below about 4% on the basis of carbon monoxide in the fresh feed stream.

In another example carried out in identically the same way as the foregoing, with the exception that the addition of extraneous methane to the total feed is omitted, the conversion on the basis of the hydrogen supplied in the fresh feed amounts to only slightly above 90% with a total net methane production of about 5% on the basis of the carbon monoxide supplied in the fresh feed, and a net production of about 10% carbon dioxide on the same basis.

In yet another example otherwise the same as the foregoing, but for a recycle rate of five and without the use of extraneous methane, there is a net production of methane equal to about 15% on the basis of the carbon monoxide supplied. The net production of carbon dioxide is about 5% on the same basis.

From the foregoing it is apparent that the present invention provides a system wherein the net production of carbon dioxide and methane may be suppressed to insignificant values. This may be accomplished without wasting raw materials insofar as the methane used to suppress the reaction may be required to make up the thermal demands of the plant. Thus it may be advisable to determine the volume of saturated hydrocarbon gas necessary for this requirement and correlate the recycle ratio to the most appropriate value.

Obviously many modifications and variations of the invention, as hereinbefore set forth, may be made without departing from the spirit and scope thereof, and therefore only such limitations should be imposed as are indicated in the appended claims.

We claim:

1. In the synthesis of normally liquid hydrocarbons, oxygenated hydrocarbons and mixtures thereof, wherein a synthesis gas mixture consisting essentially of hydrogen and carbon monoxide in a relative molar ratio X, ranging between about 1:1 and about 4:1, is passed in contact with a dense fluid phase mass of a solid particle iron hydrocarbon synthesis catalyst in a reaction zone at a temperature in the range of about 500-700° F., and wherein the reaction product effluent stream is withdrawn from contact with the catalyst in the reaction zone, treated for the removal of normally liquid products of reaction, leaving the residual mixture of normally gaseous products of reaction, and the normally gaseous mixture is recycled to the inlet of the reaction zone without altering the composition thereof, the improvement which comprises supplying as a feed to said reaction zone a mixture consisting of said synthesis gas, said residual normally gaseous reaction product mixture and a substantial supplemental addition of a saturated light gaseous hydrocarbon of the class consisting of methane, ethane and propane, and regulating the recycle rate of said normally gaseous reaction product mixture at a value equal to about $$\frac{4.46}{X} - 0.64 \pm 0.3$$

based on the standard volume ratio of said unaltered recycle mixture to the synthesis gas feed, thereby substantially restricting the production of methane and carbon dioxide with the formation of additional desired liquid products.

2. The method according to claim 1 wherein said saturated light gaseous hydrocarbon comprises methane.

3. The method according to claim 1 wherein the rate of feed of said supplemental saturated light gaseous hydrocarbon amounts to about 25–200% by volume on the basis of the carbon monoxide in said synthesis gas stream.

4. The method according to claim 1 wherein the rate of feed of said supplemental saturated light gaseous hydrocarbon amounts to about 40–200% by volume on the basis of the carbon monoxide in said synthesis gas stream.

5. The process according to claim 1 wherein the molar ratio of $H_2$ to CO in the said synthesis gas is within the range of about 1.5:1 to 2.5:1.

DU BOIS EASTMAN.
LEON P. GAUCHER.

REFERENCES CITED

The following references are of record in the file of this patent:

UNITED STATES PATENTS

| Number | Name | Date |
|---|---|---|
| 2,224,049 | Herbert | Dec. 3, 1940 |
| 2,231,990 | Dreyfus | Feb. 18, 1941 |
| 2,274,064 | Howard et al. | Feb. 24, 1942 |
| 2,361,997 | Dreyfus | Nov. 7, 1944 |
| 2,417,164 | Huber, Jr. | Mar. 11, 1947 |
| 2,436,957 | Eastman | Mar. 2, 1948 |
| 2,459,444 | Main | Jan. 18, 1949 |
| 2,486,894 | Watson | Nov. 1, 1949 |
| 2,539,415 | Garbo | Jan. 30, 1951 |
| 2,553,433 | Vesterdal | May 15, 1951 |

OTHER REFERENCES

Report No. 248–45, U. S. Naval Technical Mission in Europe, pp. 26, 27. Received Oct. 29, 1945.